May 30, 1967 J. S. SCOGGIN 3,322,957
DEVICE WITH PHOTOELECTRIC FAILURE ALARM
Filed Dec. 20, 1963
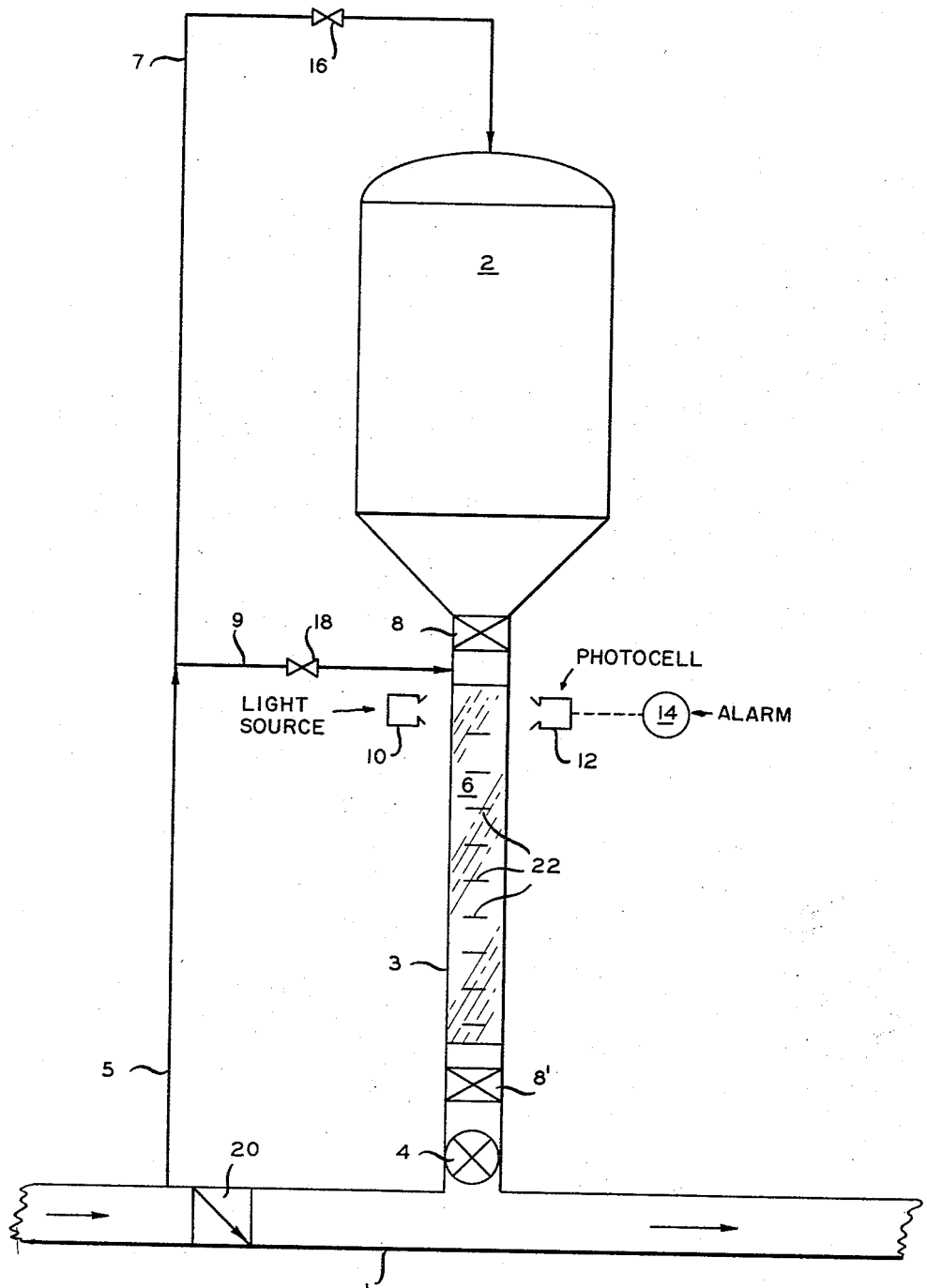
INVENTOR.
J. S. SCOGGIN
BY Young & Quigg
ATTORNEYS 3,322,957
DEVICE WITH PHOTOELECTRIC
FAILURE ALARM
Jack S. Scoggin, Bartlesville, Okla., assignor to Phillips Petroleum Company, a corporation of Delaware
Filed Dec. 20, 1963, Ser. No. 332,175
2 Claims. (Cl. 250—218)

This invention relates to feeding measured quantities of particulate solids. In one aspect this invention relates to feeding precise quantities of solids, such as catalyst, dry or in the slurry, into a pressurized zone. In another aspect this invention relates to an alarm system for solids feeders. In still another aspect this invention relates to in-operation calibration of solids feeders. In a still further aspect this invention relates to improved method and apparatus for carrying out a catalytic reaction.

In many instances it is desirable and oftentimes necessary to feed very accurate quantities of particulate solids, for example, the introduction of solid catalyst to polymerization processes. In polymerization processes the quantity of catalyst present in the reactor determines the reaction rate, catalyst productivity and polymer properties. The manipulation of the rate of catalyst feed to a polymerization process can be used to vary and control the reaction. However, it is difficult to insure continuous accurate feeding rates of particulate solids, especially catalysts, dry or in slurry, because of plugging, bridging and abrasion wear of the measuring and metering devices employed.

Accordingly, it is an object of this invention to provide continuous, accurate feeding of particulate solids. It is another object of this invention to provide improved method and means for insuring continuous, accurate, feeding of solids, such as catalysts in small quantities. Still another object of this invention is to provide an improved alarm system for indicating the depletion of the solids. Still another object of this invention is to provide method and means for in-operation calibration of a solids metering device.

Other objects, aspects and advantages of this invention will become apparent upon further study of this disclosure, the drawing and appended claims.

In accordance with one embodiment of my invention, there is provided in the downcomer between a solids hopper and metering device a calibration means with a light source and photoelectric cell co-operatively associated therewith and alarm means operatively connected to said cell.

Further in accordance with my invention, a method is provided for in-operation calibration of a metering device wherein the quantity of solids passing therethrough per length of time is determined.

The invention is applicable to the metering and feeding of any particulate solid material in dry form or in a slurry with a suitable diluent. It finds particular utility in the metering and feeding of catalyst slurries to polymerization processes. In such processes where the catalyst is necessary to the reaction the alarm aspect of the invention aids to insure sufficient catalyst available and the in-operation calibration of the metering device provides for continuous, accurate feeding of the catalyst to the process as the rate the metering device feeds catalyst varies because of abrasion wear due to the catalyst.

My invention will now be described in more detail with reference to the drawing which shows a suitable solid feeding and metering device with the means I have provided included therein.

Referring now to the drawing, solids hopper 2 communicates with transporting conduit 1 by way of downcomer conduit 3. Solids metering device 4, shown as a star valve, is located in conduit 3 near its juncture with conduit 1. Downcomer conduit 3 is provided with a transparent section 6, such as glass tubing having calibration markings 22. Section 6 can be provided with indicia representing the volume of solids therein. In downcomer 3 at each end of section 6 are closing means 8 and 8', such as plug valves as shown. Disposed in alignment across downcomer 3 is light source 10 and photoelectric cell 12. Alarm device 14 is operatively connected to cell 12. Conduit 5 communicates conduit 1 with the upper portion of hopper 2 by conduit 7 having valve 16 therein and with the upper portion of downcomer 3 below plug valve 8 by conduit 9 having valve 18 therein. Check valve 20 is positioned in conduit 1 between the junctures therewith of conduits 3 and 5 to insure the flow of sufficient material through conduit 5 to effect slurrying of solids and the flow thereof through conduit 3 into conduit 1.

The alarm system aspect and calibration aspect of my invention can be employed separately or advantageously in combination by having a certain volume in the downcomer between the top plug valve and light source and employing the alarm to indicate the time required for flow of the certain volume of solids through the metering device when the top plug valve is closed to determine (calibrate) the metering rate.

In operation, for the polymerization of ethylene employing a chromium oxide catalyst in a pentane diluent, pentane is fed to a reactor (not shown) through conduit 1. A batch of catalyst is placed in hopper 2 and pentane from conduit 7 flows through conduit 7 and valve 16 to slurry the catalyst in hopper 2. Plug valves 8 and 8' are opened and the catalyst mud flows through downcomer 3 and metering device 4 in conduit 1 for transport to the reactor. Metering device 4 feeds approximately 0.1 pound catalyst per hour. Light source 10 directs a light toward downcomer 3 and when the catalyst mud level drops below the light source, the light passes through downcomer 3 and contacts photoelectric cell 12 which actuates alarm 14. To calibrate metering device 4 during operation, valves 8 and 16 are closed, valve 18 is opened and pentane flows through line 9 into the top of downcomer 3. Operation is continued for a predetermined length of time and the catalyst level drop in downcomer 3 during this time is noted. From this information the rate of material passing through feeding device 4 is calculated. Alternatively, a predetermined level of catalyst drop is allowed in downcomer 3 and the time lapse for this to occur is noted; and the flow rate of feeding device 4 is then calibrated. Also, light source 10 can be positioned on downcomer 3 so that a definite volume of catalyst is between such level and valve 8. After this amount of catalyst passes through metering device 4, alarm 14 sounds. The alarm device can be of such nature to also record the time interval.

Variations and modifications will be apparent to one skilled in the art which will not depart from the spirit and scope of my invention.

That which is claimed is:

1. Apparatus for introducing a solids catalyst-solvent mud to a polymerization reaction zone having solvent inlet means which comprises a closed hopper, a downcomer conduit communicating with said hopper and said inlet means, means in said downcomer conduit adjacent said inlet means for controlling the flow of said mud, a transparent section in said downcomer conduit bounded at each end by plug valves, a light source and photoelectric cell positioned across said downcomer conduit near the top of said transparent section, an alarm means operatively connected to said cell, and hopper pressure equalizing means comprising an additional conduit means connecting said inlet means with the upper portion of said hopper.

2. The apparatus of claim 1 wherein said transparent section is a calibrated gage glass and gage glass pressure equalizing means comprising a conduit communicating between said pressurized zone and said gage glass.

References Cited
UNITED STATES PATENTS

| | | | |
|---|---|---|---|
| 2,381,505 | 8/1945 | Lindholm | 222—56 |
| 2,759,225 | 8/1956 | Hunter et al. | |
| 3,091,368 | 5/1963 | Harley et al. | 222—56 |
| 3,158,291 | 11/1964 | Lytton et al. | 222—39 |

RALPH G. NILSON, *Primary Examiner.*

J. D. WALL, *Assistant Examiner.*